US010445599B1

(12) United States Patent
Hicks

(10) Patent No.: US 10,445,599 B1
(45) Date of Patent: Oct. 15, 2019

(54) SENSOR SYSTEM AUGMENTED WITH THERMAL SENSOR OBJECT CONFIRMATION

(71) Applicant: Luminar Technologies, Inc., Orlando, FL (US)

(72) Inventor: Richmond Hicks, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/007,430

(22) Filed: Jun. 13, 2018

(51) Int. Cl.
| | |
|---|---|
| *G06K 9/00* | (2006.01) |
| *H04N 5/33* | (2006.01) |
| *G06T 7/70* | (2017.01) |
| *G06K 9/62* | (2006.01) |
| *G06T 7/20* | (2017.01) |
| *G05D 1/02* | (2006.01) |
| *G06T 7/50* | (2017.01) |

(52) U.S. Cl.
CPC ....... *G06K 9/00805* (2013.01); *G05D 1/0246* (2013.01); *G06K 9/6267* (2013.01); *G06K 9/6289* (2013.01); *G06T 7/20* (2013.01); *G06T 7/70* (2017.01); *H04N 5/33* (2013.01); *G05D 2201/0213* (2013.01); *G06T 7/50* (2017.01); *G06T 2207/10024* (2013.01); *G06T 2207/10028* (2013.01); *G06T 2207/10048* (2013.01); *G06T 2207/20084* (2013.01)

(58) Field of Classification Search
CPC ............ G06K 9/00805; G06K 9/6267; G06K 9/00791; G05D 1/0246; G05D 2201/0213; G06T 7/50; G06T 2207/10028; G06T 2207/10048; G06T 7/70; H04N 7/18; H04N 13/04
See application file for complete search history.

(56) References Cited

U.S. PATENT DOCUMENTS

| | | | |
|---|---|---|---|
| 7,567,687 B2 * | 7/2009 | Kudo | ............ B60R 1/00 340/435 |
| 9,286,520 B1 * | 3/2016 | Lo | ........ G06K 9/00791 |
| 9,632,502 B1 * | 4/2017 | Levinson | .......... G01S 7/4972 |
| 9,754,490 B2 * | 9/2017 | Kentley | .......... G06K 9/00805 |
| 9,972,187 B1 * | 5/2018 | Srinivasan | ........ G08B 21/0446 |
| 10,032,371 B2 * | 7/2018 | Gonzales | ............... G08G 1/09 |
| 2002/0139784 A1 | 10/2002 | Tsuchiya et al. | |
| 2004/0258279 A1 * | 12/2004 | Hirvonen | ........ G06K 9/00201 382/104 |

(Continued)

OTHER PUBLICATIONS

Nam et al., "Vehicle Classification Based on Images from Visible Light and Thermal Cameras," EURASIP Journal on Image and Video Processing (2018) 2018:5, pp. 1-9.

(Continued)

*Primary Examiner* — Dramos Kalapodas

(57) ABSTRACT

A thermal imager is used to confirm object classifications as described. In one example, a scene modeling system has a sensor system to generate an image of a scene. A thermal camera generates a thermal image of the scene within a field of regard, and a modeling processor coupled to the sensor system and to the thermal camera correlates a position of a selected object in the scene to the field of regard of the thermal camera and queries the thermal camera to confirm a classification of the selected object. The thermal camera is configured to receive the position of the selected object and to confirm the classification.

20 Claims, 9 Drawing Sheets

(56) References Cited

U.S. PATENT DOCUMENTS

| | | | |
|---|---|---|---|
| 2009/0001268 A1* | 1/2009 | Tadano | H04N 5/2351 250/330 |
| 2010/0177929 A1* | 7/2010 | Kurtz | G06K 9/00228 382/103 |
| 2010/0182433 A1* | 7/2010 | Shimbo | G06K 9/00771 348/153 |
| 2010/0309288 A1* | 12/2010 | Stettner | G01S 17/023 348/43 |
| 2012/0062372 A1* | 3/2012 | Augst | G06K 9/00798 340/435 |
| 2012/0242809 A1* | 9/2012 | White | G08G 1/0175 348/51 |
| 2013/0235210 A1 | 9/2013 | Tinkler et al. | |
| 2014/0204217 A1* | 7/2014 | Sohn | G01J 5/0859 348/164 |
| 2015/0138310 A1* | 5/2015 | Fan | G06K 9/00201 348/36 |
| 2015/0281599 A1* | 10/2015 | Slaby | G06F 16/51 348/164 |
| 2017/0160746 A1* | 6/2017 | Rao | G05D 1/0246 |
| 2017/0309174 A1* | 10/2017 | Gonzales | G08G 1/09 |
| 2018/0027205 A1* | 1/2018 | Ruther | H04N 5/44504 348/164 |
| 2018/0232947 A1* | 8/2018 | Nehmadi | G06T 17/05 |

OTHER PUBLICATIONS

Non-Final Office Action dated Oct. 10, 2018 for U.S. Appl. No. 16/007,557.

Final Office Action dated May 20, 2018 for U.S. Appl. No. 16/007,557.

\* cited by examiner

SENSOR SYSTEM AUGMENTED WITH THERMAL SENSOR OBJECT CONFIRMATION

TECHNICAL FIELD

The present description relates generally to vehicle navigation systems and in particular to object detection augmented with thermal sensor data.

BACKGROUND

Vehicle navigation systems can use object detection and classification to identify obstacles that may or may not come into the path of the vehicle. For autonomous vehicle (AV) navigation, these identified objects can be placed into a high resolution three-dimensional (3D) model of the surroundings of the vehicle. The 3D model is formed by defining a 3D grid of spaces and tracking points entering and exiting the spaces to understand what space is free, filled, or unknown due to sensor occlusion.

For example, when an object moves behind another object the system may reasonably conclude that the space behind the occlusion is occupied by that object and not free space. As the object exits the occluded area, the system may reasonably conclude that the occluded space is now free or at least that it is vacated by the object. The object classification is helpful for predicting the behavior of objects and for making navigation decisions to avoid obstacles.

Lidar, for example, can be used to generate a dense 3D point cloud and to track the movement of objects as points in that cloud. The movement of objects is tracked in all three dimensions so that lidar data is particularly well suited to generating a high resolution 3D model of the surroundings. Objects in a lidar point cloud can be identified by the lidar or in some other way. For example, visible and NIR (Near Infrared) cameras can classify objects based on color boundaries and patterns. These edges and patterns can be compared with known patterns to detect and classify objects.

BRIEF DESCRIPTION OF THE DRAWINGS

The appended claims set forth the features of the invention with particularity. The present invention is illustrated by way of example, and not by way of limitation, in the figures of the accompanying drawings in which like reference numerals refer to similar elements.

DESCRIPTION OF EXAMPLE EMBODIMENTS

Figure 1:
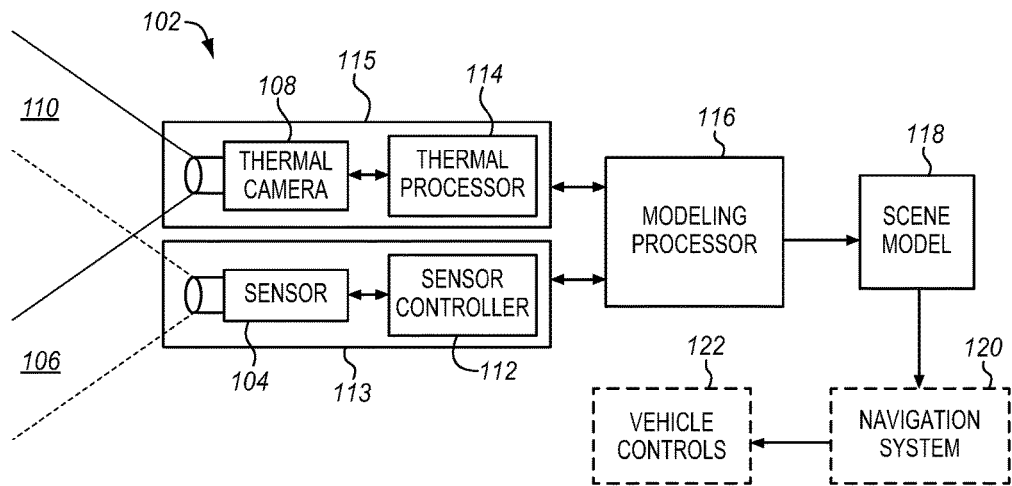
FIG. 1 is a block diagram of a scene modeling system.

As described herein, a thermal sensor or imager, such as a thermal imaging camera can be added to a vehicle navigation system. After objects have been detected by a lidar, camera or any other set of sensors, the system queries the thermal camera about a particular object. The thermal sensor of the camera is used as another source of information to determine if the object has been correctly classified or not. The compute and data demands on a thermal imaging camera system can be limited by restricting the queries to only those objects having particular classifications and by restricting the queries to programmable regions of interest corresponding to the positions of the selected objects.

As an example, a sensor, such as a lidar or visible light camera detects a person-sized shape at a particular location in the sensor's field of regard. Post-processing classifies the object as a pedestrian. The system then queries the thermal camera for the probability of a genuine pedestrian existing at the corresponding location in the field of regard of the thermal sensor of the camera. After confirmation, the pedestrian may be monitored appropriately. For some systems, the pedestrian may be added to the 3D model and tracked through multiple frames as the vehicle moves past the pedestrian.

Lidar systems do an excellent job at detecting the rough shape of an object and accurately assessing the object's position and distance from the lidar sensor. Visible and NIR (Near Infrared) cameras do an excellent job detecting the 2D position of objects and of classifying objects. However, in some cases, both of these systems can be fooled by things that appear to the sensor to be real objects. One example would be a van with pictures of people on the side. A picture can fool a camera. Although the lidar can help with this case, both the camera and the lidar would fail in a harder case such as discriminating between a cardboard cutout or sculpture of a person and a live pedestrian.

Many of the most important objects for a vehicle to navigate around have a thermal signature. People, animals, and motor vehicles all emit a unique thermal signature that allows the objects to be distinguished from each other and from other objects. The van with pictures of people might look like people to a camera but to the thermal sensor it will look like a van with an engine and exhaust. Thermal cameras will not be fooled by pictures or by shaped cutouts as they do not see the ink, and can clearly differentiate between a live person and a statue, sculpture, mannequin or cardboard cutout. This could be crucial in navigating in e.g. emergency braking circumstances, or in path planning as a pedestrian may choose to enter the roadway while a statue or sign will not. As described herein, a thermal imaging camera can be used to confirm an object classification hypothesis.

As described, thermal confirmation can be performed with only a very small amount of data from a thermal sensor. The logic necessary to interpret the thermal images can be integrated directly into the thermal imaging camera system, using enhanced readout circuits or die stacking, to achieve the required density. By architecting the thermal camera system such that images or full images cannot be read, the classification logic of the navigation system may have indirect access to higher fidelity or faster frame rates from the thermal camera than is provided using a traditional thermal camera interface.

FIG. 1 is a block diagram of a scene modeling system with an imaging sensor system augmented with a thermal imaging camera. The scene modeling system 102 has a sensor system 113 with a sensor field of regard 106 and a thermal camera system 115 with a thermal field of regard 110. The two fields of regard overlap so that objects imaged by the sensor system are within a field of regard visible to the thermal camera.

The lidar system 113 has a lidar 104 coupled to a lidar controller 112 that drives and controls the lidar and receives return data generated by the lidar. There may be an optical system within the lidar system 113 for directing laser pulses, modulated waves or any other format of light to the scene and for directing the resulting laser reflections into a detector of the lidar 104. The lidar controller may be integrated into the lidar or implemented as multiple components. The lidar controller generates a point cloud in which each point represents a three-dimensional position in the scene in the field of regard. The particular configuration, resolution, and other information generated by the lidar processor and the manner of operation of the lidar processor may be modified to suit different implementations. The point cloud is sent to a 3D modeling processor 116 to be used in generating a 3D model 118 of the scene. The controller may alternatively be a part of the modeling processor or independent as shown.

The lidar 106 will typically generate frames or partial frames that are used to identify objects in the frames and then the objects are classified in the lidar controller 112 or in the connected modeling processor 116. One approach to object detection for a lidar, is to first generate motion vectors for each point in the lidar point cloud by comparing point positions in the cloud for each frame. The motion vector for each frame indicates how that point has moved from the previous frame. In embodiments, the motion vectors are compensated for movement of the vehicle and the lidar through the scene. The motion vectors may be used to group points together as relating to the same object. As an example, a vehicle moving down the road in front of the lidar will be represented by many points. These points will all move toward and away from the lidar together as the corresponding vehicle will move toward and away from the lidar.

In another example, the sensor 113 is or also includes a visible light camera system 113 with a camera 104 having a photodetector array sensor and circuitry that generates digital images of the scene within its field of regard 106 as determined by an optical system that focuses light from the scene onto the sensor 104. The images are sent to an image processor 112. In embodiments, the camera operates at a frame rate and generates a new image or frame at a rate determined by the frame rate. The frame rate may be determined by the image processor or other upstream component. The images may be 2D color representations of the scene or 3D representations using multiple cameras to generate disparity data.

The image processor 112 receives the images from the camera and then uses image understanding techniques to detect image objects and then to classify or recognize the detected objects. As a part of these tasks or as an additional task, each detected object is localized. A variety of different techniques can be used for object classification some of which are designated as artificial intelligence. As a result, a particular part of the image may be identified as corresponding to a physical object such as a vehicle, a wall, a curb, a street sign, etc. The object classifications are then sent to the modeling processor 116. The image processor may be discrete as shown or it may be incorporated into the modeling processor or the camera.

In embodiments, a logic circuit controls the operation of the camera and a separate dedicated logic block performs artificial intelligence detection, classification, and localization functions. Dedicated artificial intelligence or deep neural network logic is available with memory to allow the logic to be trained to perform different artificial intelligence tasks. The classification takes an apparent image object and relates that image object to an actual physical object. The image processor provides localization of the object with within the 2D pixel array of the camera by determining which pixels correspond to the classified object. The image processor may also provide a distance or range of the object for a 3D localization. For a 2D camera, after the object is classified, its approximate size will be known. This can be compared to the size of the object on the 2D pixel array. If the object is large in terms of pixels then it is close, while if it is small in terms of pixels, then it is farther away. Alternatively, a 3D camera system may be used to estimate range or distance.

Object classification and localization in the image processor may be performed using any of a variety of different techniques. A Viola-Jones object detection framework may be operated in real time by a parallel image processing engine in the image processor or by a separate connected or integrated parallel processing or neuromorphic processing engine. For Viola Jones, characteristic object features are detected in the image. These are combined to form integral images. The integral images are then tested by a cascaded sequence of classifiers to arrive at detected objects. Alternatively, a convolutional neural network (CNN) approach such as Faster Regional CNN or You Only Look Once type object detection, classification, and localization may be used. The CNN engine may include image buffers alternating with convolutional layers connected in a cascading sequence to produce a final object image or set of object images as outputs. These buffers and layers may be implemented in general purpose, graphics, or specialized neural network circuits. As mentioned above, the detected object is then tracked in the lidar point cloud.

A variety of different visible light cameras may be used, such as CMOS (Complementary Metal Oxide Semiconductor) or CCD (Charge Coupled Device) cameras, with different color and sensitivity characteristics. Visible light is suggested because objects designed for human perception are best perceived using visible light. In addition, visible light cameras and image processors are commonly available. The camera may have a different or extended spectrum so that only some colors are perceived or so that infrared or ultraviolet are also perceived by the camera. While 2D images are discussed herein, the camera may be replaced with a multiple sensor or 3D camera so that 3D images are provided and analyzed for object classification. For some object classification techniques, a 3D image provides more accurate results. However, the distance data absent from a 2D image may instead be generated by a lidar or by other sensors.

The 3D modeling processor 116 combines the lidar point cloud, the camera images, the object classifications and any other suitable system information to generate a 3D model 18 of the scene. This model will include any classified objects and the sizes and positions of the objects in three dimensions. The object classification allows the future behavior of the object to be predicted. As an example, a tree's behavior will be to remain stationary and the outer periphery of the tree will likely bend in a collision. A pedestrian's behavior may be to move in any direction at any time, but it will never move very fast. The sizes and positions of the objects allows the scene to be fully characterized.

The 3D model 118 may be used for any of a variety of different purposes. In this example, the model is optionally provided to a vehicle navigation system 120. The vehicle navigation system is optionally coupled directly or indirectly to vehicle controls 122 to direct the vehicle on an intended path. The vehicle is referred to herein primarily as an automobile but the systems and methods described herein are not so limited. Any type of land vehicle whether it drives on roads, paths, guideways, tracks, or open areas, indoors or outdoors, may benefit from the sensor and scene modeling systems described herein. Water vehicles, such as boats, ships, or submarines and airborne vehicles may also benefit from the systems and methods described herein. In addition while the system is described as having a field of regard in a direction of forward travel, sensors may be directed in other directions and additional sensors may be used to observe multiple directions simultaneously. The 3D model may include objects in multiple different directions from the vehicle.

The sensor system whether used for navigation or in an AV (Autonomous Vehicle) system, may be a part of the obstacle detection system as the sensor or as part of a suite of sensors which detect objects and then classify the objects. A thermal camera system 115 is added to this obstacle detection system. Some object classes will have a characteristic thermal signature. If an object belongs to such a class, and if the object is important to understand, then the system, such as the modeling processor 116 or the sensor controller 112, queries the thermal camera system about that particular object.

The thermal camera system 115 has a thermal imaging camera 108 with a particular field of regard 110 that overlaps the field of regard of the sensor. The thermal camera has readout circuitry that sends frames of image data to a thermal camera processor 114 that analyzes the received data as described in more detail below. The camera processor 114 may be formed on the same die as the readout circuitry of the camera 108 or it may be on a different die that is stacked with or attached directly or indirectly to the camera. The camera processor may be used to control the camera resolution, frame rate, capture times, etc. and to perform processing on received images for object detection, pattern matching, etc.

A variety of different thermal imaging sensor technologies may be used. One example is a microbolometer that operates at room temperature and is commonly available with sensitivity to light from about 7 μm to about 15 μm. Some such sensors are in the form of a thermal camera with megapixel resolutions and frame rates of 120 Hz or more. Some such cameras may be operated as a still or video capture device and provide an integrated package with the optics, sensor, sensor processor, and a digital interface for control and data out in a single housing. The interface may be USB (Universal Serial Bus), GMSL (Gigabit Multimedia Serial Link), RS-232 (Revised Standard 232) or other types of digital interfaces for data and control. However, other types of thermal camera may be used depending on the implementation.

Figure 2:
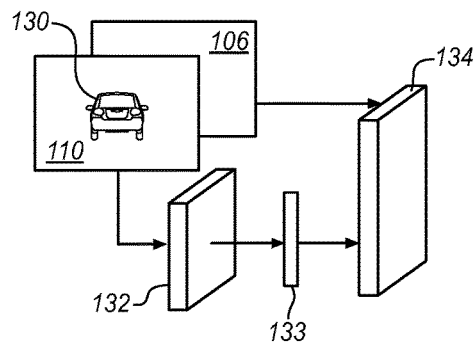
FIG. 2 is a diagram of correlating a scene as perceived by the sensor system to the thermal camera field of view.

FIG. 2 is a diagram of correlating a scene as perceived by the sensor system to the thermal camera field of view. As shown, there is a sensor system frame for the illustrated field of regard 106 and a thermal imager frame for the field of regard 110. Both systems have captured a view of the scene and the back of a localized vehicle 130 appears in the scene in both of the frames and can be perceived by both systems. The sensor frame 106 is shown in 2D to allow it to be more easily compared to the thermal frame 110. The diagram is greatly simplified so that there is only one object, however, there may be many more. The fields of regard of the frames 106, 110 are not perfectly aligned, as shown. In practice, the thermal camera may cover only a small part of the lidar field of regard or vice versa and multiple thermal cameras or sensors may be used to cover the entire scene as mentioned above.

The sensor frames may be used to generate a 2D image of the scene 134 or a 3D point cloud or a 3D model or any other suitable construct. When the sensor system 113 classifies an object, that object may be represented in a 2D image 106 or 2D list of points or pixels that are included in the object. The set of points 132 of FIG. 2 may represent a buffer that contains the pixels of the entire image 106 or just the object 130. FIG. 2 shows this set of points 132 from the sensor that are classified, e.g. as the back of a vehicle 130.

This position or location of this object in the sensor frame is adjusted to the thermal imager frame by correction factors 133 to correlate the sensor frame to the thermal frame. The correction factors 133 may be stored in another memory as a single horizontal and vertical adjustment value for all pixels or as an array of factors to apply to different ones of the pixels 132. In other words, the pixels 132 of the object 130 are correlated to the thermal camera frame 134 by applying the correction factors 133 to shift the pixel positions to corresponding pixel positions of the thermal camera frame 134. The selected pixels 132 may be presented as a matrix, table, or list and the correction factors may be one or more arithmetic or logarithmic factors that may be applied with a look-up table or a mapping table. This configuration may be in the sensor processor or the modeling processor. The adjusted position or points may then be applied to the thermal camera frame 134 from the sensor. Having sent the corrected location of the object to the thermal camera, the classification of the object can be checked by the thermal camera without the thermal camera making such an adjustment.

Figure 3:
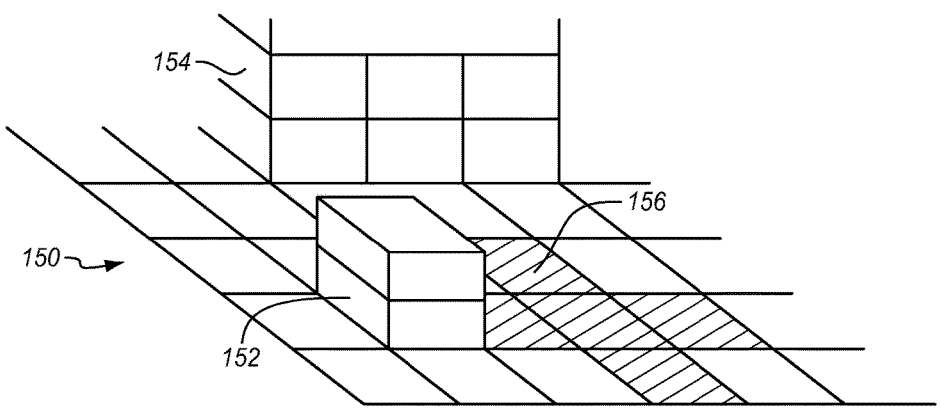
FIG. 3 is an isometric diagram of a scene model with occluded areas.

FIG. 3 is an isometric view diagram of a portion of a 3D model 118 of a scene. The model may represent a roadway in front of an autonomous vehicle (not shown). The model is presented as a low-resolution grid with a predetermined resolution. The resolution may be adapted to suit the lidar point cloud data or camera sensor data or any other sensor system 113 used by the system and the processing and memory capabilities in any particular implementation. In this case the model 150 has a vehicle 152 in front of the sensor and a building 154 to the side of the roadway. The 3D model provides height as well as position and depth. This may be useful if there are obstacles that are above the vehicle or below the vehicle or if the path does not have a level topography. The 3D model may also be useful for airborne or waterborne vehicles. The 3D model may have an occluded area 56 for which there is no current available data. The occluded area may be treated as occupied until more information is obtained.

If these objects are classified and correlated to points in the lidar or other sensor system, then the points corresponding to the vehicle 152 in front of the sensor can be modeled as a single object so that the computations are simpler. If the vehicle is moving, then it represents an obstacle but, as a vehicle, the sensor can move down the roadway without colliding. If the other obstacle 154 to the side is classified as a building or wall then it will not have motion except with respect to the moving vehicle that carries the sensors and can be modeled as stationary on the grid. All of these objects are to be avoided by the vehicle as it travels down the roadway.

For navigation purposes, the objects in the 3D model can be compared to an intended path through the model to determine whether there are any obstacles to that path. In embodiments, the model has occupied space and free space. The occupied space is occupied by objects. These objects may or may not be identified. The navigation system is designed to keep the vehicle in the free space and away from obstacles in the occupied space. As described below, there may also be occluded areas for which the system cannot determine whether the space is free or occupied. The navigation system may then direct the vehicle controls to cause the vehicle to avoid the obstacles while maintaining travel in the direction of the path. In an automobile, the controls may be accelerator, brakes, and steering to keep the automobile on the road and in a lane without colliding with any object in the lane.

Figure 4:
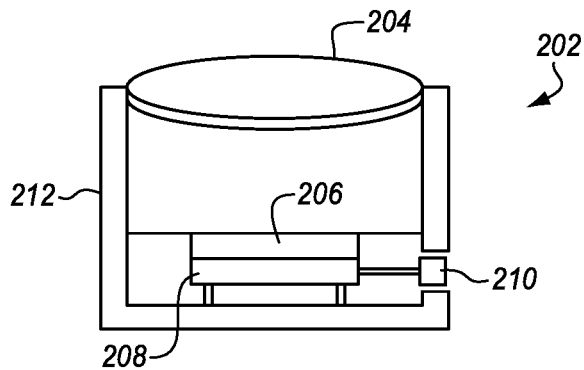
FIG. 4 is a side cross-sectional view diagram of a thermal camera system.

FIG. 4 is a side cross-sectional view diagram of a thermal camera system suitable for use as described herein. The system 202 has an integrated construction with reduced data output. Infrared or thermal waves from the surrounding scene are focused by an optical system 204 to impinge upon a microbolometer 206. A microbolometer is a bolometer used as a detector in a thermal camera. Infrared radiation with wavelengths between 7.5-14 µm that strikes the detector material, heats the material and thereby changes the material's electrical resistance in proportion to the amount of heating. Any other suitable detector may be used instead.

The material is coupled to readout circuitry on an attached die 208. The resistance change is measured and processed by the readout circuit as amplitudes for each pixel which can be used to create a thermal image. The image has an amplitude for each circuit similar to the gray scale of a black and white picture. The readout circuit is implemented on a die that is physically attached to the microbolometer. The die also includes processing circuitry that can be altered only within predetermined parameters.

The readout circuitry may be very simple to produce an output voltage signal for each pixel. This provides room on the die for additional logic circuitry to interpret the pixels, apply frame rates and even for image understanding. The readout circuitry die can be used to implement a higher level of functionality than simply providing a thermal image at a particular resolution and frame rate.

The readout circuitry die is coupled to an input/output interface 210 to receive and transmit data packets with other processors. The system may be powered through the input/output interface or in any other way. As an example, if the camera system input/output interface is a USB interface then power may be supplied from a host through the USB connection to the input/output interface to power the camera as well as to provide a data interface.

The optical system, sensor, readout and logic circuitry are sealed within an enclosure or package 212. As a result, opening the package exposes the system 202 to damage. In addition, the sensor, readout circuit, and logic circuits cannot be separated from each other without significant damage to the affected components.

Figure 5:
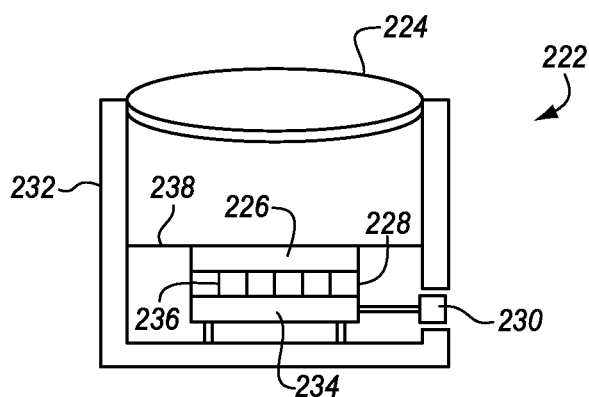
FIG. 5 is a side cross-sectional view diagram of an alternative thermal camera system.

FIG. 5 is side cross-sectional view of an alternative thermal camera system using stacked dies. The thermal camera system 222 has an exterior housing, package, or enclosure 232 that carries an optical system 224 to direct impinging infrared light to a sensor 226 such as a microbolometer. A readout circuit 228 is formed on a die below the sensor layer to read each of the pixels of the sensor. The readout circuit may be physically attached to the microbolometer and supply power from the input/output interface.

The readout circuit is stacked over a second die 234 for the logic circuitry. Thru-silicon vias (TSV) 236 are copper or other conductor filled paths through the readout circuit die to electrically connect the readout circuitry to the logic circuitry for data and optionally power connections. Other types of data and power connections may alternatively be used including leads and wires. The two dies are attached by solder joints between the two dies. The die stack is mounted inside the package and held in place therein. An input/output interface 230 is attached to the logic circuit to support data communication and any other appropriate connections. The dies may be stacked or attached in other ways if desired including wire bonding, gold balls, or any other appropriate method.

Additional layers may optionally be added to the stack in the same or a similar way to increase the compute density of the thermal camera system. The stack may be constructed so that separating out the microbolometer array or the read out portions of the stack is close to impossible without damaging the functionality of the device. In some packaging technologies, the stacked dies are covered in a dielectric mold compound or encapsulant, such as a filled epoxy resin 238. Such a mold compound protects the dies and prevents them from being separated.

Figure 6:
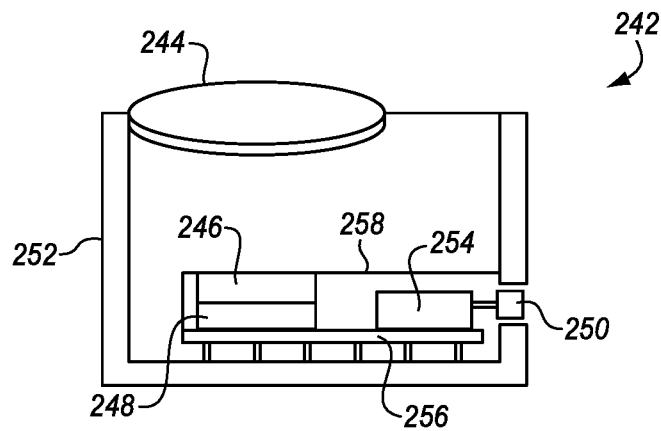
FIG. 6 is a side cross-sectional view diagram of another alternative thermal camera system.

FIG. 6 is a cross-sectional side view diagram of another alternative thermal camera system using packaged dies. In this example, a readout circuit die 248 is attached to an infrared sensor array 246 and the die is attached to a package substrate 256 such as a silicon or printed circuit board substrate. A logic circuit die 254 and an input/output interface die 250 are also attached to the package substrate. The dies may be attached using surface mount technology or wire lead technology to electrical pads or lands of the substrate. The substrate may include electrical pathways, such as leads or wiring layers to couple the dies to each other through the substrate for data and power. A package cover 258 is placed over the dies to protect and seal the dies. The cover may be formed of a molded plastic or ceramic material over and around the dies and sealed to the substrate or it may be an encapsulant. In the case of an epoxy resin encapsulant a transparent material may be used to allow the infrared light to pass through and warm the pixels of the sensor array 246.

The packaged dies are attached to the interior of the housing, or package 252 which also holds the optical system 244 in place. In this and the other examples there may be more or fewer dies and they may be attached vertically or horizontally. There may be power supply and cooling systems (not shown) to otherwise support the camera system. Structures of the examples of FIGS. 4, 5, and 6 may be combined and various features and structures may be added or removed from any of the versions or variations thereof. For example, different types of covers of different materials may be used with any of the examples. The housings 212, 232, 252 may be formed of molded materials that are open inside to hold the components or formed of a solid material that is molded around the other components.

In some embodiments, the processing system of the navigation system determines an object classification so that the task of the readout circuity is limited to confirming the classification. This may be done for example by receiving a template and an image position at the I/O interface, comparing the template to the sensor data at the indicated position and sending a match or no match signal back out through the I/O interface. By limiting the functionality of the classification problem, the logic required for the readout circuitry can be simplified. This will reduce the size, cost and power requirements of the thermal sensor stack in the thermal camera system. The budget required for such a limited performance thermal sensor is reduced.

By architecting the thermal sensor device such that images cannot be read directly from the sensor, the classification logic of the navigation system may have access to higher fidelity or faster frame rates than can be achieved using a traditional thermal camera. In such an implementation, the higher fidelity and frame rates are available only for particular positions at which an object has been detected and classified. The entire image is not used by the navigation system and is not needed.

Figure 7:
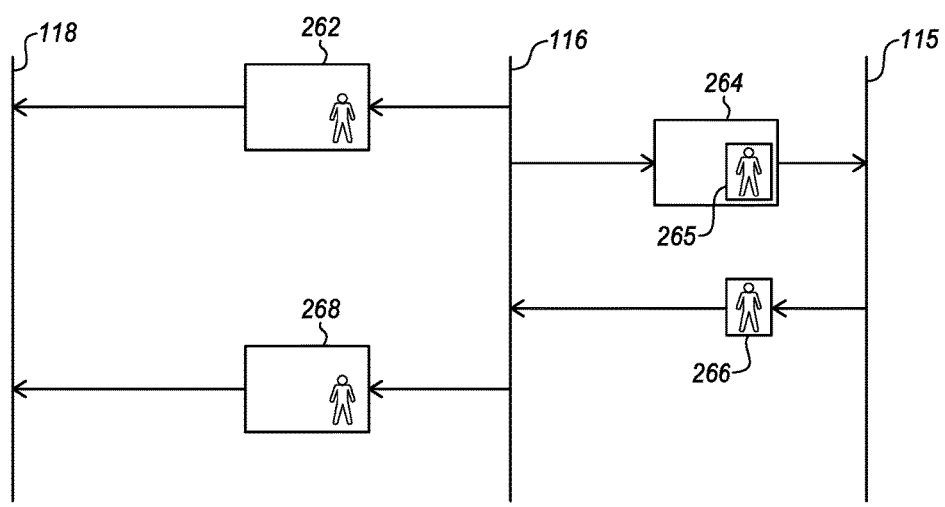
FIG. 7 is a signaling diagram to indicate a generalized flow of information to confirm an object in a model.

FIG. 7 is a signaling diagram to indicate a generalized flow of information to confirm an object in the 3D model or any other type of classified object using the thermal camera. The modeling processor 116 or any other suitable component generates the 3D model 118 or any other suitable characterization of the scene around the sensor 113. As shown in this example, the modeling processor sends a frame 262 that includes a pedestrian in one corner. The frame represents the data in any suitable form that indicates the position of the pedestrian as being in the corner and an identification of the pedestrian as such. In some cases, the frame may represent a depth slice in the 3D model and a height, width representation of the position of the pedestrian.

Having classified the object as a pedestrian, the modeling processor then sends a query 264 to the thermal camera system 215 to confirm the classification. The query may be presented in a variety of different forms. In this example, the query is represented by an identification of a position or area 265 in a 2D frame of the thermal camera and the pedestrian classification. The thermal camera system has a library of pedestrian templates to compare to the thermal image. The system then determines whether the thermal image data corresponds to any known pedestrian templates and if so, then it returns a reply 266 that a pedestrian is present in the indicated area. The modeling processor may then optionally confirm 268 the pedestrian in the model or take no further action with respect to classifying the object as a pedestrian.

With the object confirmed, the navigation system may then track the object consistent with it being a pedestrian and make appropriate decisions or warnings based on the movement of the pedestrian and the movement of the vehicle that is navigating. The accurate classification of the pedestrian is important in any vehicle navigation system so that appropriate decisions or information can be provided. While it is better to swerve to avoid a pedestrian, it is not better to swerve to avoid a cardboard cutout of a person.

Figure 8:
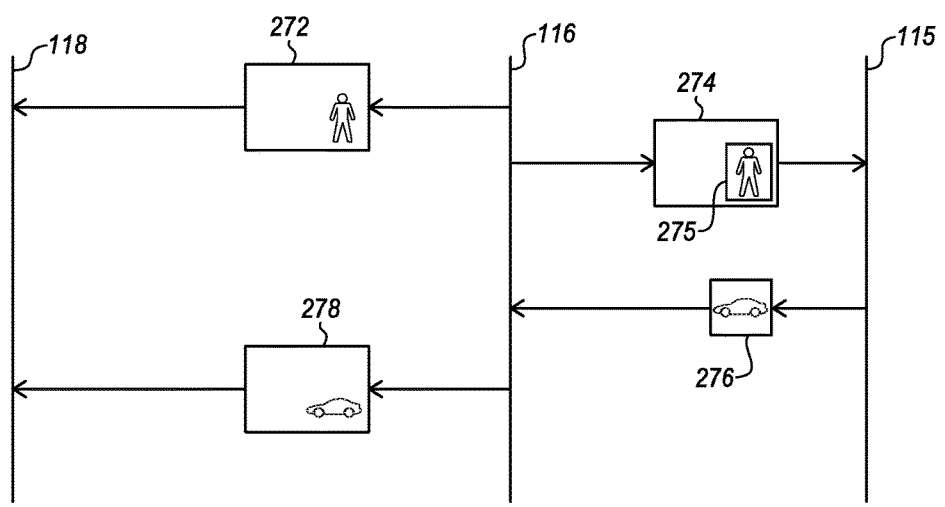
FIG. 8 is a signaling diagram to indicate an alternative generalized flow of information to confirm an object in a model.

FIG. 8 is a similar signaling diagram representing a different result. As in the previous example, the modeling processor 216 has identified and classified an object as a pedestrian and has sent this information 272 to the 3D model 218. The modeling processor also sends a query 274 to the thermal camera system to confirm a pedestrian in the indicated part 275 of the frame. In this example, the thermal camera system does not find a pedestrian in the indicated part of the frame but a truck. The truck may have a picture of a pedestrian on the side that confused the sensor. The truck result 276 is sent to the modeling processor and the modeling processor then updates the 3D model with a corrected frame 278 so that the object in the 3D model will match the truck classification.

In this example, the thermal camera system is capable of confirming that an object is a pedestrian and also capable of determining that the object is not a pedestrian but a truck. Such a correction and identification may be performed with processing resources within the thermal camera system that are able to perform pattern matching or signature processing and identification or other tasks. In other cases, the thermal camera system may return a simpler reply 276 that the object is not a pedestrian. In such a case, the thermal camera system may have thermal signatures in memory to use to determine whether the object is a pedestrian.

In another example, the compute demands of the modeling processor are reduced and the quality that is required from the thermal system is reduced. In this enhancement, the position of the identified and classified object is provided to the thermal sensor. The thermal sensor detects thermal radiation only within a specific window of the thermal sensor's field of regard as indicated by the object position information. The queries are restricted to a programmable region of interest so that the amount of data and the resolution required from the thermal sensor is greatly reduced. The query to the thermal sensor can be designed to provide detail about the expected thermal pattern and location, e.g. a pedestrian in a specified position, so that the camera only produces a positive or a negative result.

Alternatively, the modeling processor may provide a characteristic thermal pattern. signature, or template that would indicate that the object is a pedestrian. This thermal pattern may be provided in the query 274. The thermal camera may then confirm or deny 276 that the thermal pattern is present in the indicated location 275. Such a confirm or deny process requires much less processing capability within the thermal camera system. When the thermal camera 115 detects the provided pattern, signature, or template of the particular object and determines that it matches the indicated signature, then the object classification is confirmed. If not, then the modeling system 116 must determine a different classification for the object which may include classifying the object as a false alarm.

Figure 9:
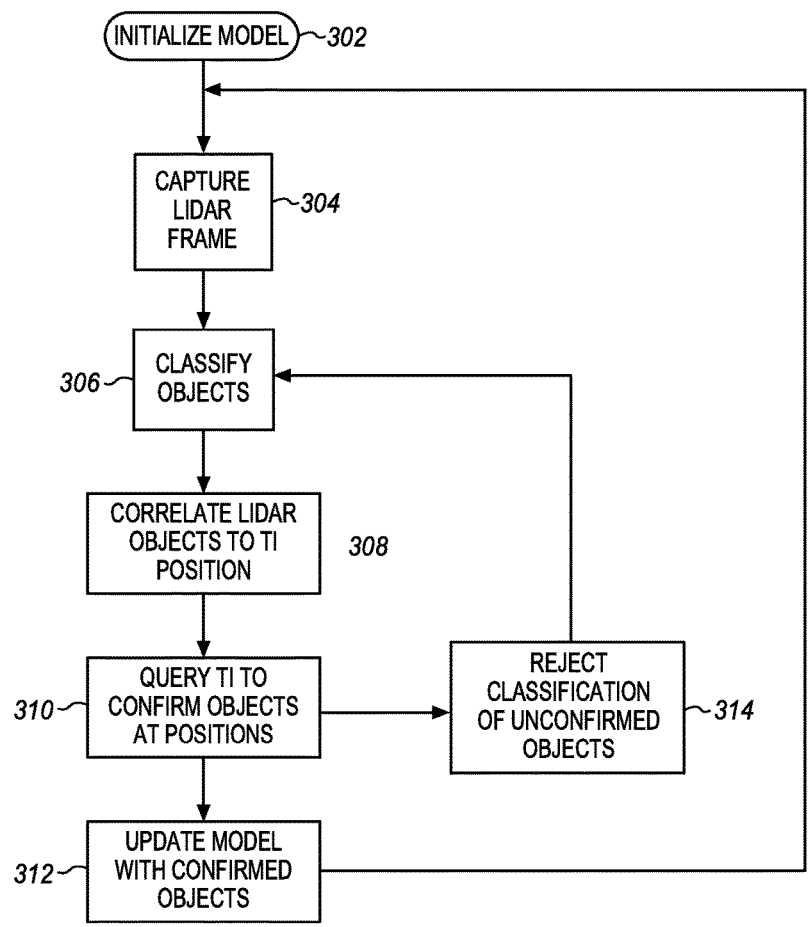
FIG. 9 is a process flow diagram of confirming object classifications using a thermal camera.

FIG. 9 is a process flow diagram of confirming object classifications using a thermal camera. This process shows that the thermal camera or thermal imager (TI) can be integrated into generating a 3D model on a spatial grid or another type of spatial representation by an autonomous vehicle (AV). At 302 the model is initialized. The lidar system is used to capture frames of the surrounding environment at 304. Other sensors may be used instead of or in addition to the lidar, including a visible light camera, an infrared camera, radar, sonar or other imaging sensors. The lidar controller 112 sends a sequence of point clouds or point cloud changes over time so that a motion vector can be associated with each point in the point cloud. In embodiments, the lidar has a frame rate and completes a full scan of its field of regard after each frame. Each complete frame provides an update to the point cloud.

The frames are used to identify objects in the frames and then the objects are classified at 306. These classifications may include a vehicle, person, tree, building, road sign, etc. The classification provides some information as to likely movement and size. The classification may also be used to estimate if a part of the object is occluded by other objects in the surroundings. As an example, if a tree is recognized using branches and leaves, but the bottom of the tree is occluded, the system might estimate a position of a tree trunk in the occluded part of the surroundings.

The classifications can be used to determine whether each object is of concern to the AV. Some objects may be classified as not being obstacles or obstructions to any expected path of the AV and so may be ignored. The important classified objects are correlated to positions within the field of regard of the thermal imager at 308. This allows a query to be sent to the TI regarding important objects in a particular position at 310. The TI may be queried to provide information regarding the image in that position or to compare the thermal image in that position to an expected image and then return a confirmation or a rejection for the comparison.

As described herein, the TI may confirm an object classification by applying an internal classification system to the thermal image. The TI then outputs a confirmation of the received classification or even an indication of a different classification. The TI may alternatively receive a pattern, signature, or template from the modeling processor or the thermal processor and determine whether the received pattern matches the thermal image. The TI then outputs a match or no match indication. In another example, the TI may receive a particular indicated position in the thermal image and then output only that part of the thermal image that corresponds to the indicated position. The position may be indicated using a central point in the TI field of view using coordinates, pixel positions or a similar value with a horizontal and vertical extent. The position may alternatively be represented as a bounding box as defined by its corners or by one corner and lengths of horizontal and vertical sides. The bounding box may be in the sensor frame or the TI frame. Using a partial image, the data throughput from the TI is therefore much less than if the entire thermal image were to be provided. The modeling processor is then able to use the partial image data to confirm the classification.

If the TI confirms the classification directly or by providing a thermal return matching the desired return, then the classified object can be tracked or processed in accordance with the classification. The model is updated with the confirmed objects at 312. On the other hand, if the classification is not confirmed, then the process returns to the classification at 306 to determine a different classification which may include a false alarm, or to wait for another frame in which the object might be better classified.

The sensor system and the thermal camera system can be configured to be independent so that in the event of a thermal camera failure, the system performance would degrade to the current state of the art for the sensor alone. In other words, the system would proceed using its best object classification without any thermal signature confirmation.

The described system takes advantage of the high quality, fast object confirmation from a thermal camera without interfering with other aspects of the system that may already be on board a vehicle. A high resolution and high frame rate thermal camera may be added to the system without increasing the compute power needed to process the thermal camera images. Instead, the images are processed within the thermal camera when the thermal camera confirms or denies the presence of the classified object. This comes with an increase in classification accuracy for greater safety.

Figure 10:
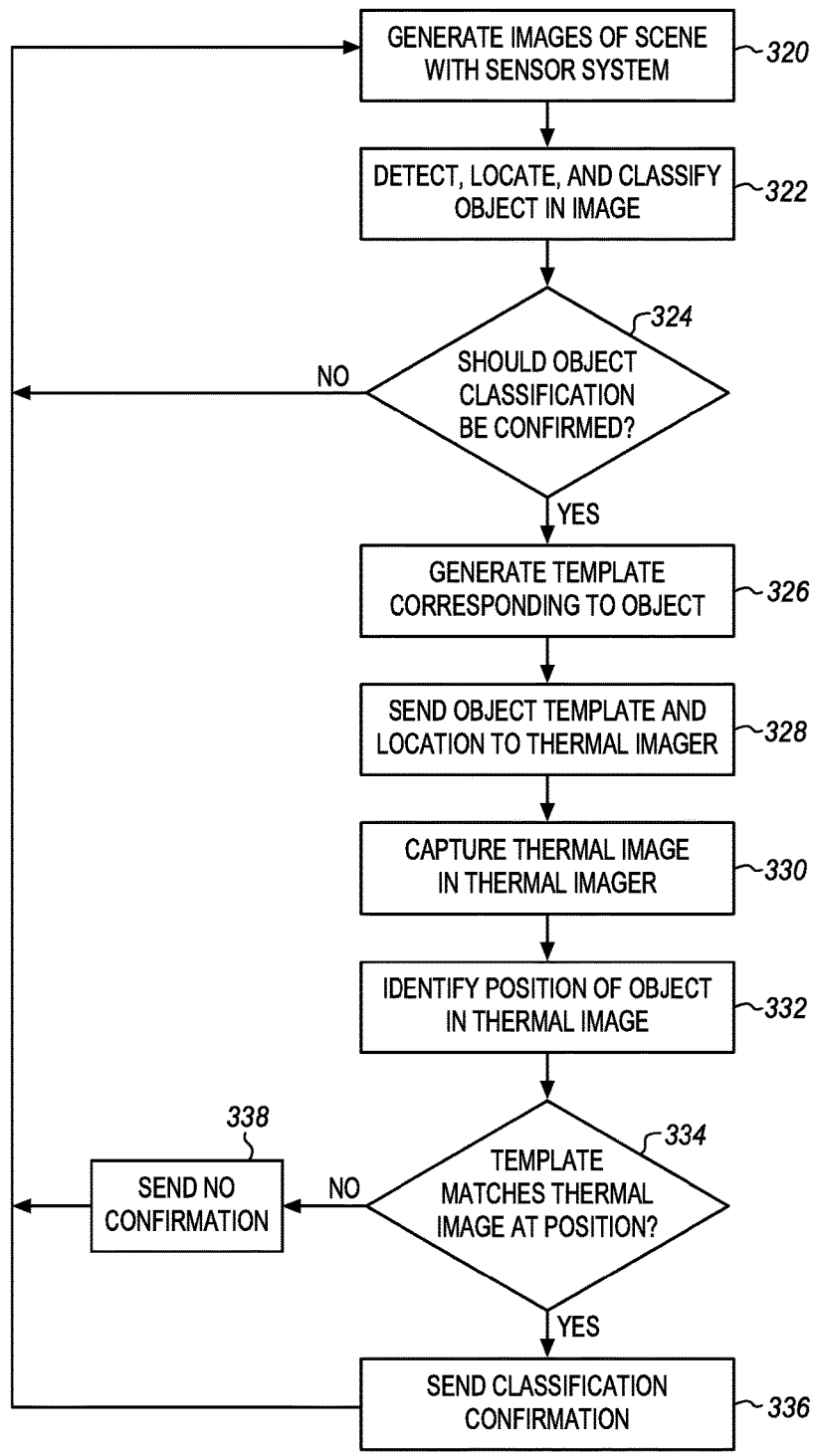
FIG. 10 is a process flow diagram of using a thermal image to confirm a classification.

FIG. 10 is a process flow diagram of using a thermal image to confirm a classification. At 320 images of a scene, such as a scene in front of a vehicle, are generated by a sensor system attached to that vehicle. At 322 objects in the images of the scene are detected, located or localized and classified. The object classification may include a time stamp, frame number, or another reference to indicate when the object was observed by the sensor. This information may be used to synchronize the object in the sensor with possible objects in the thermal imager. For some of the classified objects, the system will be configured to check the classification. These are objects that may be very important and objects for which the classification is less reliable with the particular sensor. At 324 the classified objects are evaluated to determine whether the classification of the objects should be double-checked by the thermal imager. If the object is not important or the classification is considered to be of a type that is reliable, then the process returns to 320 to generate more images and classify more objects. The classified object may be used in a 3D model as described above or in some other way for a sensor system, depending on the implementation.

On the other hand, if an object is to be confirmed at 324, then, in this example, a template is generated at 326 that corresponds to the object. This template may be generated by the modeling processor using the image of the object or it may be selected from a library of stored templates. The template will resemble a thermal image of the object in its particular orientation with respect to the sensor. The template may be in a variety of different forms and formats. At 328 the object template and the object location are sent to the thermal imaging camera system. The object location may be the location in a sensor image so that the thermal imager converts the location to a corresponding thermal image location. Alternatively, the object location may be sent as a location in the thermal image. This reduces the complexity of the thermal image operations.

At 330 the thermal imager captures thermal images. This may be a continuing process that occurs while the sensor system is also generating images. At 322 the identified position from the received confirmation query is identified in a relevant captured thermal image. One or more thermal image may be selected as being at about the same time as the sensor image or as having good thermal returns in the indicated position or for other reasons.

At 334 the thermal imager system determines whether the received template matches the thermal image in the indicated location. A positive result suggests that the classification corresponding to the template is correct. If there is a match then a classification confirmation is sent back to the modeling processor at 336 and the process returns. If the template does not match the thermal image, then the classification that corresponds to the template is probably wrong. A no confirmation message is sent at 338 back to the modeling processor. If there is no confirmation, then the modeling processor may select a different classification and send a different template to the thermal imager for confirmation as a return to 328. Any successfully classified objects can be applied to the intended use, such as forming an object in a 3D model.

In this example, only time, location, and templates are sent to the thermal imaging camera. This allows the thermal camera response to be very simple.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. The principles and systems described herein may be applied to self-driving or autonomous vehicles among other uses. The systems described below show additional details of the systems above including more detail for some of the systems and alternatives to some of the systems above. The features of these systems may be combined in various ways to suit particular applications.

Figure 11:
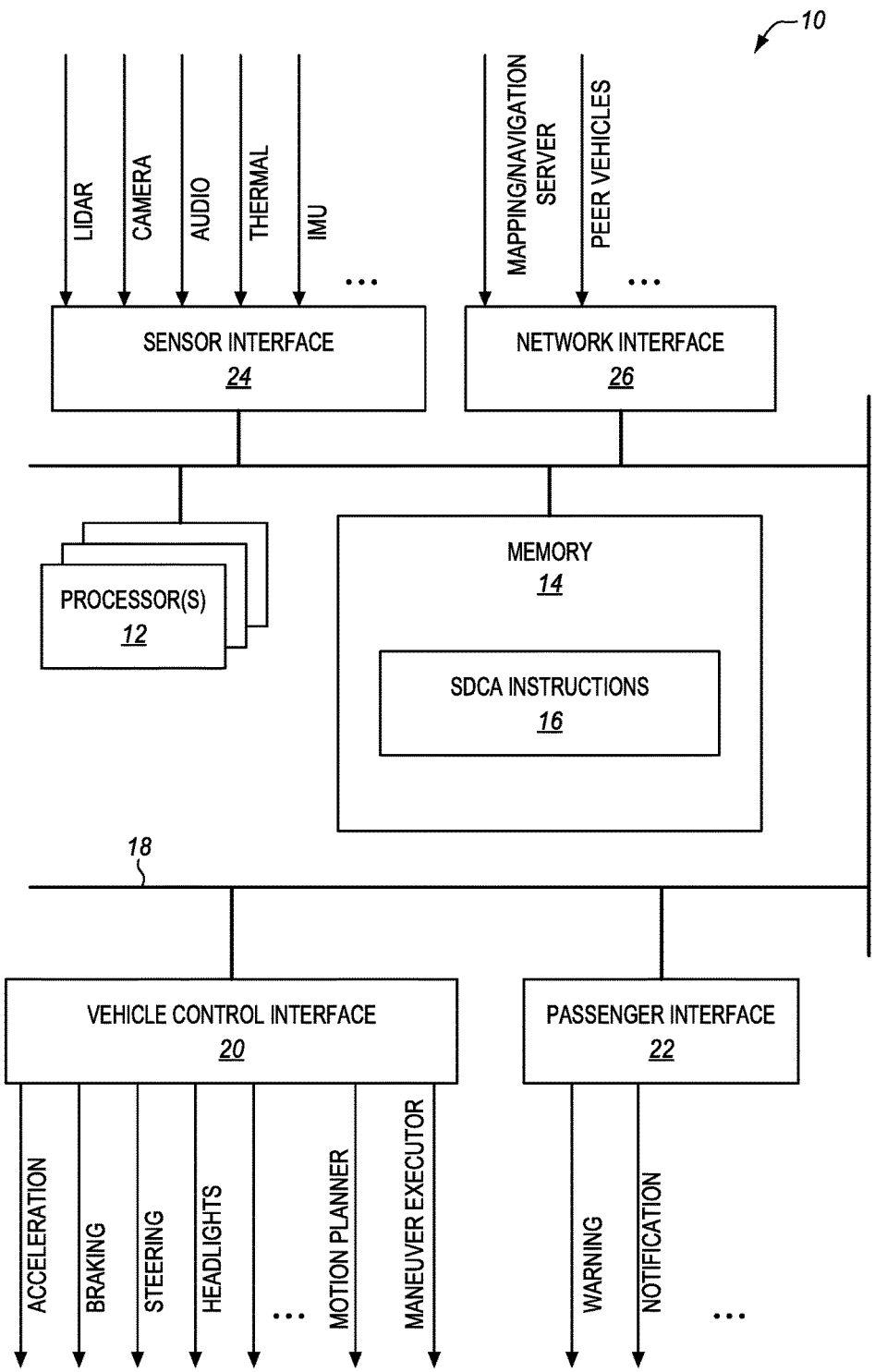
FIG. 11 is block diagram of an example computing system for controlling and/or operating an autonomous vehicle.

FIG. 11 includes a block diagram of an example computing system 10 for controlling and/or operating an autonomous vehicle. The computing system 10 may be integrated within an autonomous vehicle in any suitable manner, and at any suitable location or locations within the vehicle. For example, the computing system 10 may be included, or partially included, within a vehicle controller that is on-board an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output or signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUs, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included the network interface 26, e.g., a cellular network interface, while one or more peer vehicles (e.g., other autonomous vehicles) may send data (e.g., current positions of the other vehicles) to the computing system 10 via a different type of wireless network interface included in the network interface 26, e.g., a Wi Fi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 execute the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 11, the network 18 may also couple to other types of interfaces and/or components. Additionally, in some embodiments, one or more of the interfaces shown in FIG. 11 may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 12:
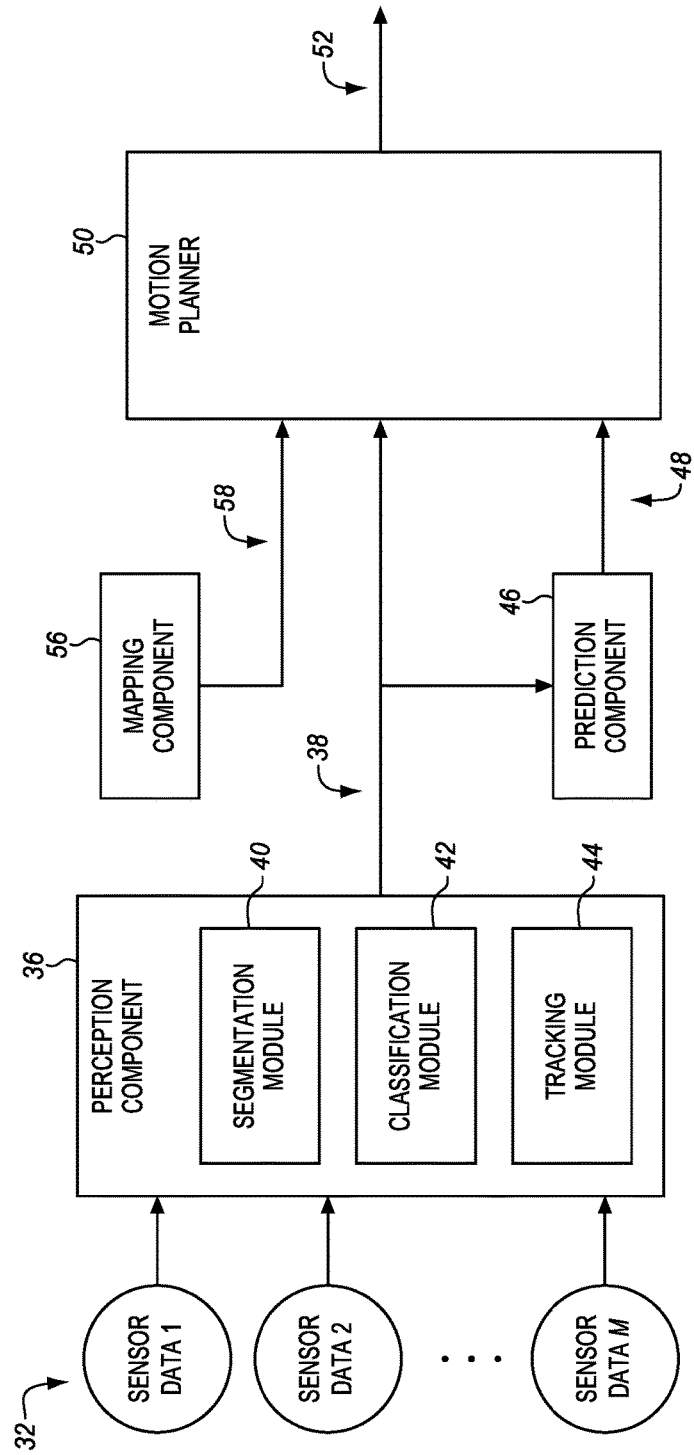
FIG. 12 is a block diagram of an example self-driving control architecture (SDCA) of an autonomous vehicle.

FIG. 12 illustrates an example self-driving control architecture (SDCA) 30 of an autonomous vehicle. Generally speaking, a SDCA 30 may generate instructions for controlling various operations and maneuvers of an autonomous vehicle. The SDCA 30 may be implemented by the SDCA instructions 16 of FIG. 11, in an embodiment. The SDCA 30 receives as input M sets of sensor data 32 generated by M different sensors, with M being any suitable integer equal to or greater than one. The sensor data 32 may be received via the sensor interface 24 of FIG. 11, in an embodiment. As just one example, "sensor data 1" may include frames of point cloud data generated by a first lidar device, "sensor data 2" may include frames of point cloud data generated by a second lidar device, "sensor data 3" (not shown in FIG. 12) may include frames of digital images generated by a camera, and so on. As discussed above with respect to FIG. 11, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as camera data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may identify as distinct objects, within a point cloud, any clusters of points that meet certain criteria (e.g., having no more than a certain maximum distance between the points in the cluster, or having the same relative velocity). As another example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 46, which processes the perception signals 38 to generate prediction signals 48 descriptive of one or more predicted future states of the autonomous vehicle's environment. For a given object, for example, the prediction component 46 may analyze the type/class of the object (as determined by the classification module 42) along with the recent tracked movement of the object (as determined by the tracking module 44) to predict one or more future positions of the object. As a relatively simple example, the prediction component 46 may assume that any moving objects will continue to travel on their current direction and with their current speed, possibly taking into account first- or higher-order derivatives to better track objects that have continuously changing directions, objects that are accelerating, and so on. In some embodiments, the prediction component 46 also predicts movement of objects based on more complex behaviors. For example, the prediction component 46 may assume that an object that has been classified as another vehicle will follow rules of the road (e.g., stop when approaching a red light), and will react in a certain way to other dynamic objects (e.g., attempt to maintain some safe distance from other vehicles). The prediction component 46 may inherently account for such behaviors by utilizing a neural network or other machine learning model, for example. The prediction component 46 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 42, possibly with an "unknown" class for certain pixels that were not successfully classified. Similarly, the prediction signals 48 may include, for each such grid generated by the perception component 36, one or more "future occupancy grids" that indicate predicted object positions, boundaries and/or orientations at one or more future times (e.g., 1, 2 and 5 seconds ahead).

A mapping component 56 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 50 processes the perception signals 38, the prediction signals 48, and the mapping and navigation signals 58 to generate decisions 52 regarding the next movements of the autonomous vehicle. Depending on the type of the motion planner 50, the decisions 52 may include operational parameters (e.g., braking, speed and steering parameters) and/or particular maneuvers (e.g., turn left, move to right lane, move onto shoulder of road, etc.). The decisions 52 may be provided to one or more operational subsystems of the autonomous vehicle (e.g., if the decisions 52 indicate specific operational parameters for subsystems that include mechanical components, such as steering mechanisms, accelerator, brakes, lights, etc.), or may be provided to one or more intermediate stages that convert the decisions 52 into operational parameters (e.g., if the decisions indicate specific maneuvers to be performed by a maneuver executor).

The motion planner 50 may utilize any suitable type(s) of rules, algorithms, heuristic models, machine learning models, or other suitable techniques to make driving decisions based on the perception signals 38, prediction signals 48, and mapping and navigation signals 58. For example, the motion planner 50 may be a "learning based" planner (e.g., a planner that is trained using supervised learning or reinforcement learning), a "search based" planner (e.g., a continuous A*planner), a "sampling based" planner (e.g., a planner that performs random searches in a space that represents a universe of possible decisions), a "predictive control based" planner (e.g., a model predictive control (MPC) planner), and so on. In some embodiments, the motion planner 50 includes multiple, different motion planner types in order to provide a more diverse set of mechanisms for generating driving decisions, and thereby improve safety and/or other performance aspects of the autonomous vehicle.

Light detection and ranging (lidar) is a technology that can be used to measure distances to remote targets. Typically, a lidar system includes a light source and an optical receiver. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

Figure 13:
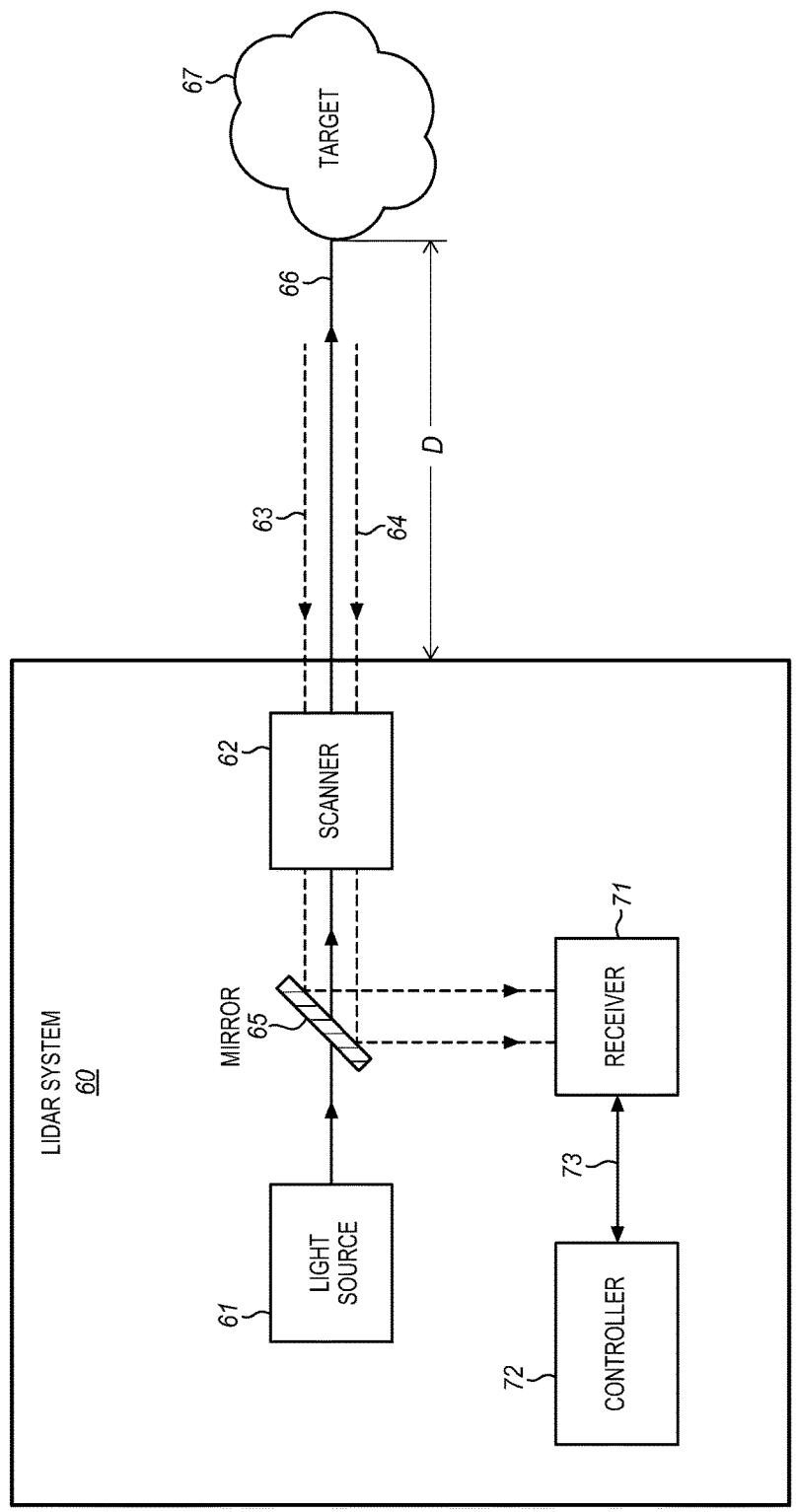
FIG. 13 is a block diagram of an example light detection and ranging (lidar) system.

FIG. 13 illustrates an example light detection and ranging (lidar) system 60. In particular embodiments, a lidar system 60 may include a light source 61, mirror 65, scanner 62, receiver 71, or controller 72. The light source 61 may include, for example, a laser which emits light having a particular operating wavelength in the infrared, visible, or ultraviolet portions of the electromagnetic spectrum. The light source 61 emits an output beam of light 66 which may be continuous wave (CW), pulsed, or modulated in any suitable manner for a given application. The output beam of light 66 is directed downrange toward a remote target 67.

Once the output beam 66 reaches the downrange target 67, the target may scatter or reflect at least a portion of light from the output beam 66, and some of the scattered or reflected light may return toward the lidar system 60. In the example of FIG. 1, the scattered or reflected light is represented by input beam 63, 64 which passes through scanner 62 and is reflected by mirror 65 and directed to receiver 71. In particular embodiments, a relatively small fraction of the light from output beam 66 may return to the lidar system 60 as input beam 63, 64.

In particular embodiments, receiver 71 may receive or detect photons from input beam 63, 64 and generate one or more representative signals. For example, the receiver 71 may generate an output electrical signal 73 that is representative of the input beam 63, 64 and the electrical signal 73 may be sent to controller 72. In particular embodiments, receiver 71 or controller 72 may include a processor, computing system (e.g., an ASIC or FPGA), or other suitable circuitry. A controller 72 may be configured to analyze one or more characteristics of the electrical signal 73 from the receiver 71 to determine one or more characteristics of the target 67, such as its distance downrange from the lidar system 60. This can be done, for example, by analyzing the time of flight or phase modulation for a beam of light 66 transmitted by the light source 61. If lidar system 60 measures a time of flight of T (e.g., T represents a round-trip time of flight for an emitted pulse of light to travel from the lidar system 60 to the target 67 and back to the lidar system 60), then the distance D from the target 67 to the lidar system 100 may be expressed as D=c·T/2, where c is the speed of light (approximately $3.0 \times 10^8$ m/s).

In particular embodiments, lidar system 60 may include a scanner 62 configured to scan an output beam 66 across a field of regard of the lidar system 60. As an example, scanner 62 may include one or more scanning mirrors configured to pivot, rotate, oscillate, or move in an angular manner about one or more rotation axes. The output beam 66 may be reflected by a scanning mirror, and as the scanning mirror pivots or rotates, the reflected output beam 66 may be scanned in a corresponding angular manner.

In particular embodiments, a scanning mirror may be attached to a scanner actuator or mechanism which pivots or rotates the mirror over a particular angular range. A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism.

In particular embodiments, scanner 62 may be configured to scan the output beam 66 (which may include at least a portion of the light emitted by light source 61) across a field of regard of the lidar system 60. A field of regard (FOR) of a lidar system 60 may refer to an area, region, or angular range over which the lidar system 60 may be configured to scan or capture distance information. In other embodiments, scanner 62 may be configured to direct the output beam 66 towards specific points in the FOR rather than scanning the output beam across the entire FOR, reducing the number of points captured by the lidar system.

In particular embodiments, a lidar system 60 may be used to determine the distance to one or more downrange targets 67. By scanning the lidar system 60 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. In particular embodiments, lidar system 60 may be configured to repeatedly capture or generate point clouds of a field of regard at any suitable frame rate. In particular embodiments, a point-cloud frame rate may be substantially fixed, or a point-cloud frame rate may be dynamically adjustable.

Although this disclosure describes or illustrates example embodiments of lidar systems 60 or light sources 61 that produce light waveforms that include pulses of light, the embodiments described or illustrated herein may also be applied to other types of light waveforms, including continuous-wave (CW) light or modulated light waveforms. For example, a lidar system 60 as described or illustrated herein may include a light source 61 configured to produce pulses of light. Alternatively, a lidar system 60 may be configured to act as a frequency-modulated continuous-wave (FMCW) lidar system and may include a light source 61 configured to produce CW light or a frequency-modulated light waveform.

Although FIG. 13 utilizes one or more scanning mirrors to target the output beam, other embodiments of lidar system 60 may be used. In particular embodiments, lidar system 60 may be a flash lidar that captures an entire FOR with a single laser flash. In other embodiments, lidar system 60 may use lasers that are coupled to a mechanically rotating platform.

Figure 14:
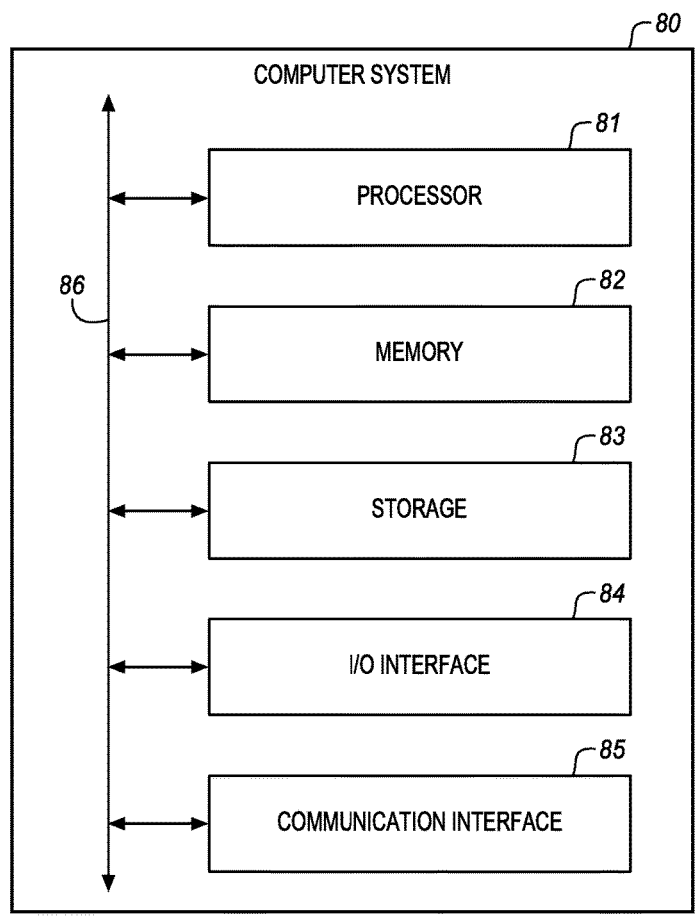
FIG. 14 is a block diagram of an example computer system.

FIG. 14 illustrates an example computer system 80. In particular embodiments, one or more computer systems 80 may perform one or more steps of one or more methods described or illustrated herein. In particular embodiments, one or more computer systems 80 may provide functionality described or illustrated herein. In particular embodiments, software running on one or more computer systems 80 may perform one or more steps of one or more methods described or illustrated herein or may provide functionality described or illustrated herein. Particular embodiments may include one or more portions of one or more computer systems 80. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 80 may take any suitable physical form. As an example, computer system 80 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 80 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 80 may include one or more computer systems 80; be unitary or distributed; span multiple locations; span multiple machines; span multiple data centers; or reside in a cloud, which may include one or more cloud components in one or more networks. Where appropriate, one or more computer systems 80 may perform without substantial spatial or temporal limitation one or more steps of one or more methods described or illustrated herein. As an example, one or more computer systems 80 may perform in real time or in batch mode one or more steps of one or more methods described or illustrated herein. One or more computer systems 80 may perform at different times or at different locations one or more steps of one or more methods described or illustrated herein, where appropriate.

As illustrated in the example of FIG. 14 computer system 80 may include a processor 81, memory 82, storage 83, an input/output (I/O) interface 84, a communication interface 85, or a bus 86. Computer system 80 may include any suitable number of any suitable components in any suitable arrangement.

In particular embodiments, processor 81 may include hardware for executing instructions, such as those making up a computer program. As an example, to execute instructions, processor 81 may retrieve (or fetch) the instructions from an internal register, an internal cache, memory 82, or storage 83; decode and execute them; and then write one or more results to an internal register, an internal cache, memory 82, or storage 83. In particular embodiments, processor 81 may include one or more internal caches for data, instructions, or addresses. Processor 81 may include any suitable number of any suitable internal caches, where appropriate. As an example, processor 81 may include one or more instruction caches, one or more data caches, or one or more translation lookaside buffers (TLBs). Instructions in the instruction caches may be copies of instructions in memory 82 or storage 83, and the instruction caches may speed up retrieval of those instructions by processor 81. Data in the data caches may be copies of data in memory 82 or storage 83 for instructions executing at processor 81 to operate on; the results of previous instructions executed at processor 81 for access by subsequent instructions executing at processor 81 or for writing to memory 82 or storage 83; or other suitable data. The data caches may speed up read or write operations by processor 81. The TLBs may speed up virtual-address translation for processor 81. In particular embodiments, processor 81 may include one or more internal registers for data, instructions, or addresses. Processor 81 may include any suitable number of any suitable internal registers, where appropriate. Where appropriate, processor 81 may include one or more arithmetic logic units (ALUs); may be a multi-core processor; or may include one or more processors 81. In particular embodiments, processor 81 may be a general-purpose single- or multi-chip processor, a digital signal processor (DSP), an ASIC, a FPGA, any other suitable programmable-logic device, discrete gate or transistor logic, discrete hardware components, or any suitable combination thereof.

In particular embodiments, memory 82 may include main memory for storing instructions for processor 81 to execute or data for processor 81 to operate on. As an example, computer system 80 may load instructions from storage 83 or another source (such as, for example, another computer system 80) to memory 82. Processor 81 may then load the instructions from memory 82 to an internal register or internal cache. To execute the instructions, processor 81 may retrieve the instructions from the internal register or internal cache and decode them. During or after execution of the instructions, processor 81 may write one or more results (which may be intermediate or final results) to the internal register or internal cache. Processor 81 may then write one or more of those results to memory 82. One or more memory buses (which may each include an address bus and a data bus) may couple processor 81 to memory 82. Bus 86 may include one or more memory buses. In particular embodiments, one or more memory management units (MMUs) may reside between processor 81 and memory 82 and facilitate accesses to memory 82 requested by processor 81. In particular embodiments, memory 82 may include random access memory (RAM). This RAM may be volatile memory, where appropriate. Where appropriate, this RAM may be dynamic RAM (DRAM) or static RAM (SRAM). Memory 82 may include one or more memories 82, where appropriate.

In particular embodiments, storage 83 may include mass storage for data or instructions. As an example, storage 83 may include a hard disk drive (HDD), a floppy disk drive, flash memory, an optical disc, a magneto-optical disc, magnetic tape, or a Universal Serial Bus (USB) drive or a combination of two or more of these. Storage 83 may include removable or non-removable (or fixed) media, where appropriate. Storage 83 may be internal or external to computer system 80, where appropriate. In particular embodiments, storage 83 may be non-volatile, solid-state memory. In particular embodiments, storage 83 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 83 may include one or more storage control units facilitating communication between processor 81 and storage 83, where appropriate. Where appropriate, storage 83 may include one or more storages 83.

In particular embodiments, I/O interface 84 may include hardware, software, or both, providing one or more interfaces for communication between computer system 80 and one or more I/O devices. Computer system 80 may include one or more of these I/O devices, where appropriate. One or more of these I/O devices may enable communication between a person and computer system 80. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 84 may include one or more device or software drivers enabling processor 81 to drive one or more of these I/O devices. I/O interface 84 may include one or more I/O interfaces 84, where appropriate.

In particular embodiments, communication interface 85 may include hardware, software, or both providing one or more interfaces for communication (such as, for example, packet-based communication) between computer system 80 and one or more other computer systems 80 or one or more networks. As an example, communication interface 85 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 80 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 80 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 80 may communicate using fiber-optic communication based on 100 Gigabit Ethernet (100 GbE), 10 Gigabit Ethernet (10 GbE), or Synchronous Optical Networking (SONET). Computer system 80 may include any suitable communication interface 85 for any of these networks, where appropriate. Communication interface 85 may include one or more communication interfaces 85, where appropriate.

In particular embodiments, bus 86 may include hardware, software, or both coupling components of computer system 80 to each other. As an example, bus 86 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 86 may include one or more buses 86, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 80. As an example, computer software may include instructions configured to be executed by processor 81. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or 15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A scene modeling system comprising:
    a sensor system to generate an image of a scene;
    a thermal camera to generate a thermal image of the scene within a field of regard;
    logic circuitry of the thermal camera configured to receive the thermal image;
    an input/output interface of the thermal camera configured to send and receive data packets between the logic circuitry and external components; and
    a modeling processor coupled to the sensor system and to the thermal camera through the input/output interface as an external component, the modeling processor configured to correlate a position of a selected object in the scene to the field of regard of the thermal camera;
    the modeling processor further to send a query to the thermal camera through the input/output interface of the thermal camera to confirm a classification of the selected object, the query including the position in the field of regard of the thermal camera and the classification of the selected object;

the thermal camera configured to receive the query from the modeling processor, to confirm the classification using the thermal image at the logic circuitry, and to send a confirmation to the modeling processor through the input/output interface without sending the generated thermal image to the modeling processor.

2. The system of claim 1, further comprising an image processor configured to detect and classify objects in the scene image from the sensor system and to determine a position of the classified objects and wherein the position and classification of the query are the position and classification determined by the image processor.

3. The system of claim 2, wherein the image processor is integrated with the modeling processor.

4. The system of claim 1, wherein the sensor is a visible light camera and the image is a visible color image.

5. The system of claim 1, wherein the sensor is a lidar and the image is a point cloud of the scene.

6. The system of claim 1, wherein the thermal camera is configured to receive the classification of the object corresponding to the position and to compare a stored thermal pattern in a thermal camera memory of the thermal camera corresponding to the classification to the thermal image to confirm the classification.

7. The system of claim 1 wherein the thermal camera is configured to confirm the classification by sending a classification having less data than the thermal image at the logic circuitry.

8. The system of claim 1, wherein if the classification is not confirmed then the modeling processor is configured to select a different classification for the selected object.

9. The system of claim 1, wherein the modeling processor is configured to determine whether the selected object is important and to not query the thermal camera image for an object that is determined to not be important, wherein importance is based on whether the object is determined to be an obstacle to any expected path of a vehicle carrying the scene modeling system.

10. The system of claim 1, wherein the modeling processor queries the thermal camera by sending a template to the thermal camera and the thermal camera is configured to confirm the classification by comparing the received template to the thermal image.

11. The system of claim 10, wherein the template is generated based on the sensor system image of the object.

12. The system of claim 10, wherein the template is stored in a memory and retrieved based on the classification of the object.

13. A method comprising:
generating an image of a scene at a sensor system;
generating a thermal image of the scene within a field of regard at a thermal camera;
selecting and classifying an object in the scene;
correlating a position of the selected object in the scene to the field of regard of the thermal camera at a modeling processor;
querying logic circuitry of the thermal camera by the modeling processor through an input/output interface of the thermal camera to confirm a classification of the selected object, the query including the position in the field of regard of the thermal camera and the classification of the selected object;
receiving the query from the modeling processor at the thermal camera;
confirming the classification at the logic circuitry of the thermal camera using the thermal image; and
sending a confirmation of the classification from the thermal camera through the input/output interface to the modeling processor without sending the thermal image to the modeling processor.

14. The method of claim 13, further comprising:
detecting and classifying objects in the scene image from the sensor system; and
determining a position of the classified objects to correlate to the field of regard of the thermal camera.

15. The method of claim 13, wherein confirming comprises the thermal camera comparing the thermal image at the thermal camera at the received position to the classification using a thermal signature for the classification stored in a memory of the thermal camera.

16. The system of claim 13, wherein the querying comprises sending a template to the thermal camera and wherein confirming comprises the thermal camera comparing the received template to the thermal image at the thermal camera.

17. One or more computer-readable non-transitory storage media embodying software that is operable when executed to perform operations comprising:
receiving an image of a scene from a sensor system;
selecting and classifying an object in the scene;
correlating a position of the selected object in the scene to the field of regard of a thermal camera that generates a thermal image of the scene within a field of regard;
querying logic circuitry of the thermal camera through an input/output interface between to confirm a classification of the selected object in a thermal image of the thermal camera, the query having a position of the selected object in the thermal image and the classification of the selected object; and
receiving from the thermal camera logic circuitry through the input output interface a confirmation of the classification made using a thermal image at the thermal camera logic circuitry, without receiving the thermal image.

18. The media of claim 17, wherein confirming comprises sending a thermal pattern to the thermal camera corresponding to the position, the thermal camera comparing the thermal pattern to the thermal image to confirm the classification.

19. The media of claim 17, wherein receiving a confirmation comprises receiving a confirmation that the classification is not correct, the operations further comprising selecting a different classification for the selected object.

20. The media of claim 17, the operations further comprising selecting the selected object based on the classification so that some object classifications are not selected for the thermal camera.

* * * * *